Figure 1:
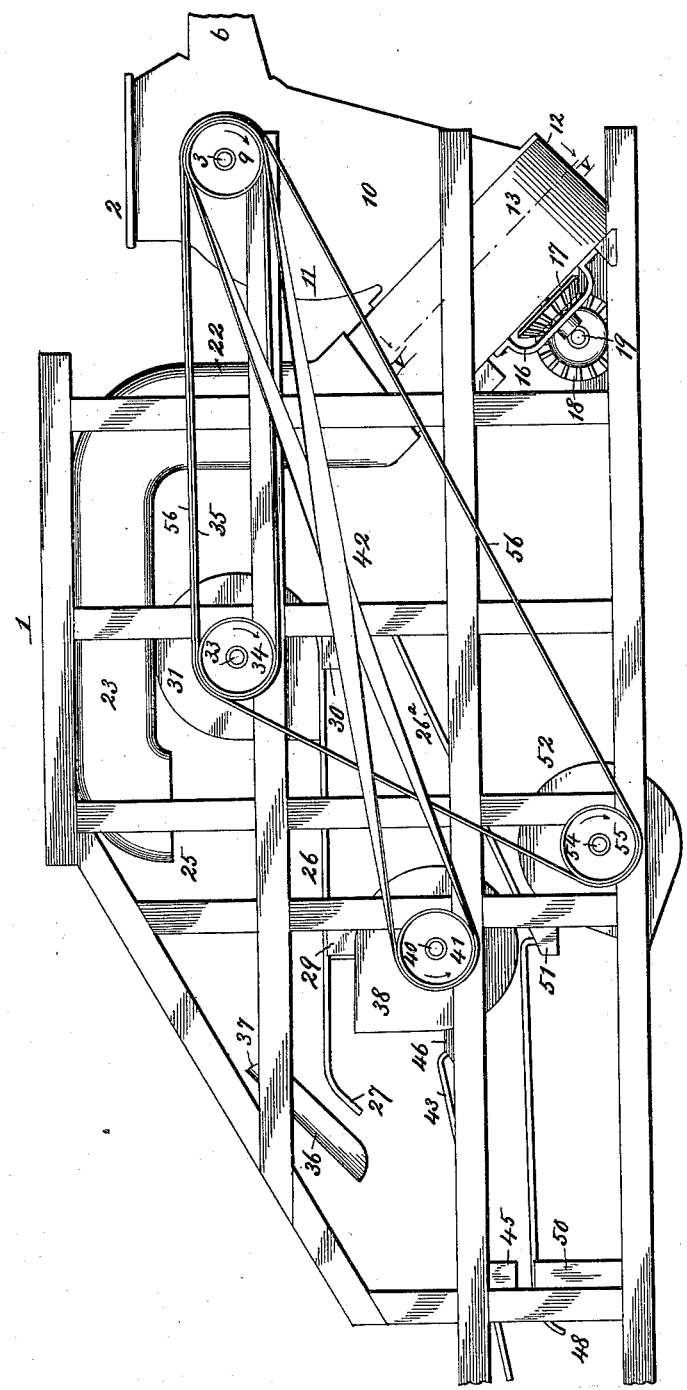

No. 662,500. Patented Nov. 27, 1900.
C. L. RING.
GRAIN SEPARATOR.
(Application filed Feb. 12, 1900.)

(No Model.) 3 Sheets—Sheet 1.

Witnesses:
H. C. Rodgers
J. W. Boling

Inventor:
Clarence L. Ring
By Fischer & Thorpe
Attys.

THE NORRIS PETERS CO., PHOTO-LITHO., WASHINGTON, D. C.

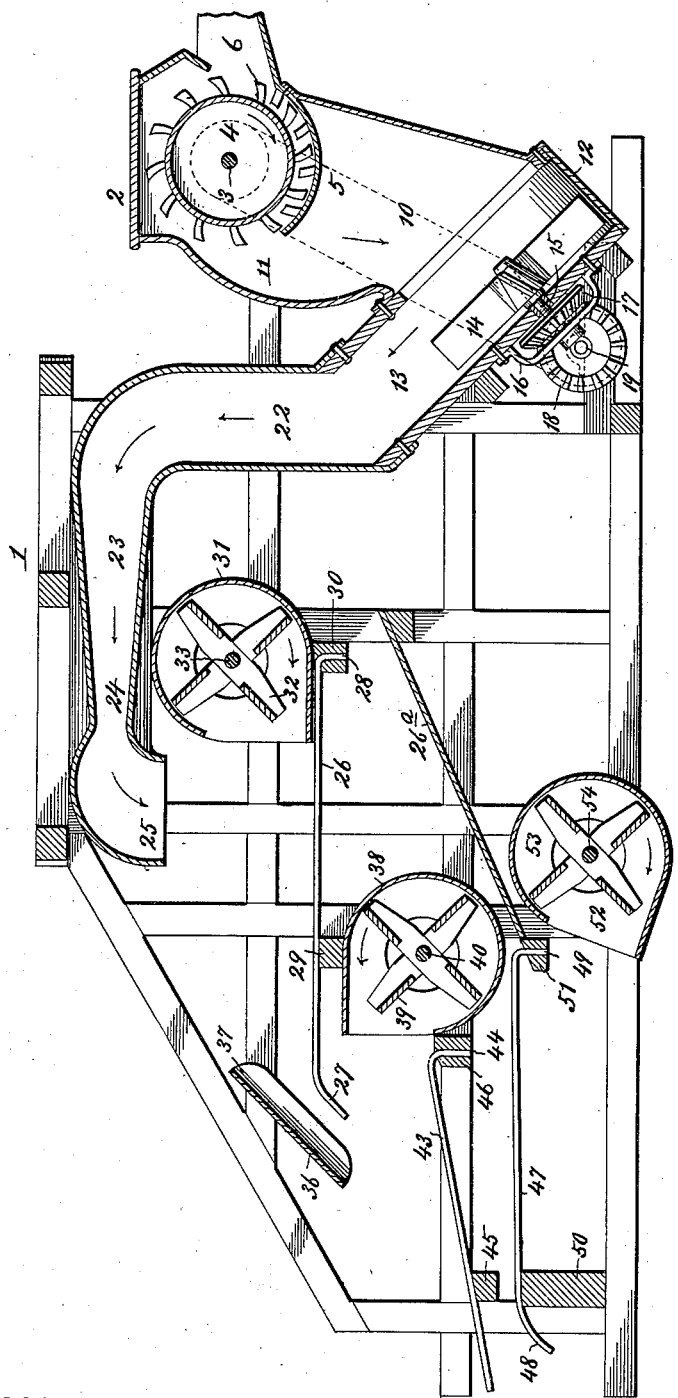

No. 662,500. Patented Nov. 27, 1900.
C. L. RING.
GRAIN SEPARATOR.
(Application filed Feb. 12, 1900.)
(No Model.) 3 Sheets—Sheet 3.
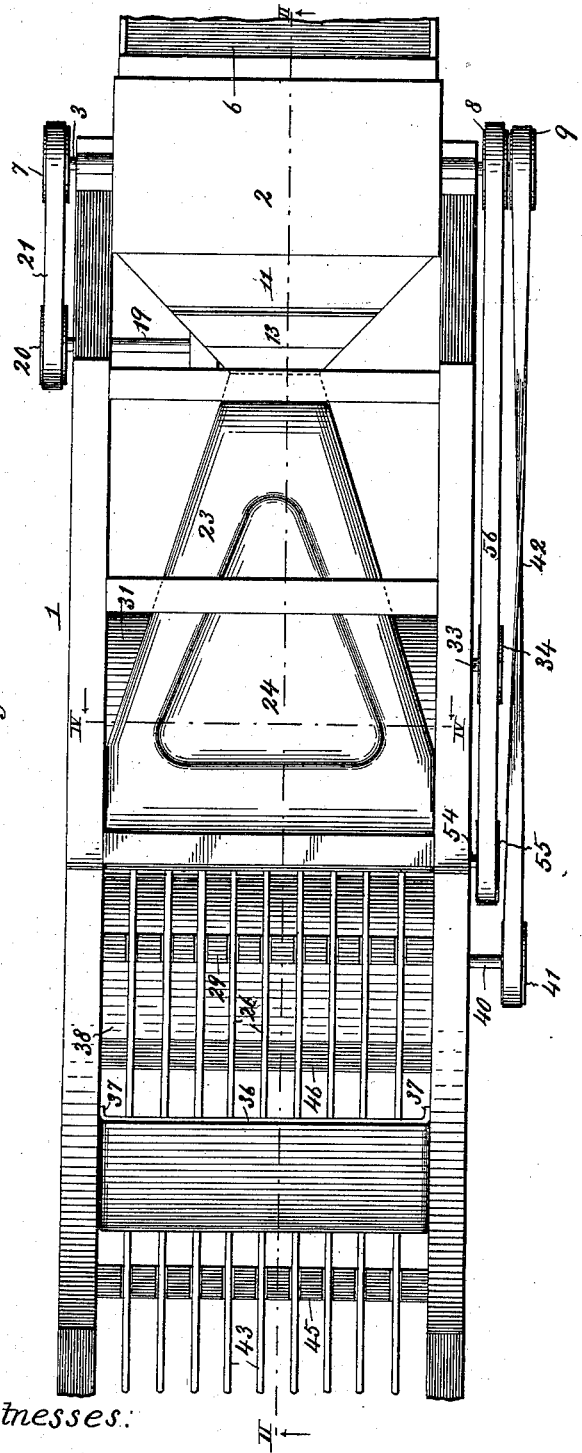
Witnesses:
H. C. Rodgers
J. W. Boling
Inventor:
Clarence L. Ring
By Fischer & Thorpe, attys.

UNITED STATES PATENT OFFICE.

CLARENCE L. RING, OF CONWAY, KANSAS.

GRAIN-SEPARATOR.

SPECIFICATION forming part of Letters Patent No. 662,500, dated November 27, 1900.

Application filed February 12, 1900. Serial No. 4,894. (No model.)

*To all whom it may concern:*

Be it known that I, CLARENCE L. RING, of Conway, McPherson county, State of Kansas, have invented a new and useful Improvement in Separators, of which the following is a specification.

My invention relates to separators; and my object is the provision of a machine by which the grain and straw may be thoroughly separated, which is practically noiseless in operation, which comprises working parts few in number and of such construction that repairs will seldom be necessary, whereby a minimum power is necessary by reason of the simplicity and arrangement of the driving-belts, which practically eliminate lost power, and finally which insures the passage entirely through the machine to the strawstack where it belongs of all dust contained in the grain, thereby facilitating and rendering the work easier for those in charge.

The invention consists, essentially, of a conveyer to receive the grain and straw from the cylinder and automatically spread and discharge it in a comparatively wide and thin sheet, a fan to force the grain and straw through the conveyer by centrifugal and air-blast power, a series of air-blast fans and skeleton grates, the former to blow the dust out of the grain and straw and the straw rearward upon the grates, and deflectors to cause the grain and straw to drop down in rear of the air-blast fans that the air-blast may act more effectually to eliminate the dust and separate the grain from the straw.

The invention further consists in certain novel and peculiar features of construction and organization, as will be hereinafter described and claimed, and in order that it may be fully understood I will proceed to describe it with reference to the accompanying drawings, in which—

Figure 1 is a side elevation of a separator embodying my invention, the framework of the separator being in skeleton form to expose interior mechanism. Fig. 2 is a vertical longitudinal section taken on the line II II of Fig. 3. Fig. 3 is a top plan view of the separator as shown in Fig. 1, the framework of the separator being also shown in skeleton in this figure. Fig. 4 is a cross-section taken on the line IV IV of Fig. 3. Fig. 5 is a section taken on the line V V of Fig. 1.

Before proceeding with the detailed description it should be stated that certain features common in separators or threshers are omitted from the illustration and description of this case, though in practice they will be employed.

Only the parts and combinations which are considered new and novel are herein shown and described.

Referring now to the drawings, where like reference-numerals designate corresponding parts in all the figures, 1 designates the framework of a separator of the usual or any preferred construction; 2, the cylinder-box; 3, the cylinder-shaft journaled therein; 4, the cylinder upon the shaft; 5, the concaves below the cylinder, and 6, the conveyer for conveying the grain-laden straw to the cylinder. These parts are of the usual construction and arrangement.

7 designates a belt-pulley on one end of the cylinder-shaft, and 8 and 9 a pair of belt-pulleys upon the opposite end of said shaft.

10 designates a funnel of proper configuration at its upper end to envelop the concaves and the rear side of the cylinder and having its rear wall opposite the point of discharge between the cylinder and concaves of curved or segmental form, as shown at 11, to act as a deflector, and thereby facilitate the passage of the grain and straw after being acted upon by the cylinder fed through the funnel and into the fan-casing 12, said fan-casing being arranged at an angle, as shown in Figs. 1 and 2, and terminating in a contracted upper end 13. 14 designates a centrifugal fan mounted in said fan-casing upon the upper end of an inclined shaft 15, journaled in the casing and in the bearing-bracket 16, secured to the under side of the casing by preference. 17 is a bevel gear-wheel mounted upon said shaft within said bracket and meshing with a similar gear 18 upon a transverse shaft 19, suitably journaled and carrying at its outer end a belt-wheel 20, connected by belt 21 to wheel 7, in order that the cylinder shall impart motion to the fan, the latter making about seven hundred revolutions per minute, to the end that it may exert centrifugal power to discharge the grain and straw up through the fan-casing and also to facilitate its progress in such direction by creating an air-blast up through the casing.

22 designates a pipe or conveyer registering with and secured to the contracted end of the fan-casing and extending upward therefrom and terminating in a rearwardly-projecting and substantially horizontal part, forming a passage 23, the sides of said passage diverging so as to gradually increase its width, and thereby effect a wide distribution and facilitate the separation of the grain and straw. The throat of the passage is also contracted at its middle by bending the top and bottom walls downward and upward, respectively, as at 24, (see Fig. 4,) in order to afford a slight resistance to the escape of the grain and straw at the point where it will first seek to escape, which resistance will act to cause the grain and straw to spread outward toward either side positively and reliably, and consequently insure the discharge of the grain and straw through said throat in a comparatively wide and thin sheet. As it leaves the throat of the conveyer it strikes the segmental hood 25 and is deflected vertically downward, intersecting the path of an air-blast, presently referred to, and dropping upon the skeleton grate 26, consisting by preference of a series of parallel longitudinally-extending rods bent downward at their rear ends to an angle of about forty-five degrees, as at 27, and at their front ends vertically downward, as at 28. The rods forming this grate rest on the grooved side of the cross-bar 29 of the machine-frame and at their front ends are secured to and upon the cross-bar 30 of the machine-frame.

Interposed between grate 26 and the conveyer, near the latter's discharge end, is a fan-casing 31, and mounted therein in the customary manner is an air-blast fan 32 upon the shaft 33, carrying a belt-pulley 34 at one end connected by a belt 35 to the belt-pulley 8 of the cylinder-shaft. (See Figs. 1 and 3.) Arranged at the discharge end of the grate and extending about parallel with the depending end 27 thereof is a deflector 36, terminating in side arms or flanges 37, projecting toward the grate. Arranged vertically below the grate, near its discharge end, is a second fan-casing 38, containing a fan 39, mounted upon a shaft 40, carrying a pulley 41 at one end connected by a cross-belt 42 to the belt-pulley 9 upon the cylinder-shaft, said belt being crossed so as to run fan 39 in the opposite direction to fan 32, and thereby discharge the air in a plane near the top of the casing and close to the discharge end of the grate 26.

43 designates a second grate arranged by preference to incline slightly downward and rearward and composed of a series of parallel longitudinally-extending rods bent downward at their front ends, as at 44, the grate being mounted upon the grooved cross-rod 45 and cross-bar 46. Just below the grate 43 is a third grate 47, also consisting of a series of longitudinally-extending rods and having their rear ends bent downward, as at 48, and their front ends, as at 49, and resting upon cross-bars 50 and 51.

Forward of and just below grate 47 is a third fan-casing 52, so arranged that an air-blast will pass upward and rearward, and thereby intersect the passage of the grain and straw between grates 43 and 47, as well as the passage of grain passing through the latter, in order to eliminate practically all of the dust and particles foreign to the grain.

53 designates a fan within casing 52 and mounted upon shaft 54, carrying a pulley 55 at one end in the same vertical plane as pulleys 8 and 34. This pulley 55 is geared to the fan-belt pulley 34 and pulley 8 of the cylinder by means of belt 56, which is arranged as shown in Fig. 1 and overlaps belt 35, being driven through the frictional action of the latter. The various pulleys are shown as of equal size in the drawings; but in practice the size of the pulleys will be proportioned to obtain the effect desired—that is to say, if it is desired to run the fans at varying speeds the diameters of the pulleys must be proportionately increased or diminished.

In practice the grain and straw after having passed through the cylinder are deflected and caused to fall vertically by the deflecting-wall 11 of the funnel onto the fan 14, which having a high velocity throws the same by centrifugal force and wind-power upward through the fan-casing and the conveyer connected thereto. As it passes rearwardly through the conveyer it is permitted to spread out by reason of the increasing width of the conveyer, and the distribution is rendered practically uniform and facilitated by the central contraction of the throat of the conveyer, as hereinbefore explained. As it strikes the segmental-shaped hood it is deflected downward, and as it intersects the path of the first air-blast the first separation action takes place. As the grain is the heavier it will drop downward in substantially a vertical line through the grate 26 onto grain-board 26ª, while the straw will be blown rearward by said blast and drop upon said grate forward of the point where the major portion of the grain passes through the latter. The grain thus separated dropping upon the grain-board 26ª below said grate, as stated, is conveyed to a point intersected by the blast from fan 53 for a more thorough cleaning. (See Fig. 2.) Meanwhile the straw, under the action of the blast from fan 32, will be forced rearwardly upon grate 26 and striking deflector 36 will pass downward onto grate 43, and in its passage from grate 26 to grate 43 will be subjected to the blast from fan 39, which will separate from the straw all grain which escaped the action of the first blast. The grain thus separated will drop down through grate 43 and grate 47 below, and in such passage will be intersected by the blast from fan 53 for the purpose of completing the elimination of the dust therefrom. The grain will also pass through the usual or any preferred cleaning apparatus (not shown) and the straw will be discharged by fan 39 off of the rear end of grate 43, as will be readily understood.

From the above description it will be apparent that I have produced a separator embodying the features of advantage enumerated as desirable in the statement of invention, and while I have illustrated and described the preferred embodiment of my invention I wish it to be understood that such changes in the form, proportion, detail construction, or arrangement of the parts as properly fall within the spirit and scope without sacrificing any of the advantages of the appended claims I reserve the right to make.

Having thus described the invention, what I claim as new, and desire to secure by Letters Patent, is—

1. In a separator, the combination of a threshing mechanism, a fan-casing below the same, a funnel arranged to conduct the discharge from the threshing mechanism to the fan-casing, a conveyer connected to the fan-casing having its discharge end wider than its receiving end, and having its top and bottom walls bent toward each other so as to provide a vertically-contracted throat, and a centrifugal fan located in said casing and adapted to force the grain and straw discharged into the casing up through the conveyer, substantially as described.

2. In a separator, the combination of a threshing mechanism, a fan-casing below the same, a funnel arranged to conduct the discharge from the threshing mechanism to the fan-casing, a conveyer connected to the fan-casing having its discharge end wider than its receiving end, and having its top and bottom walls bent toward each other so as to provide a vertically-contracted throat, a centrifugal fan located in said casing and adapted to force the grain and straw discharged into the casing up through the conveyer, and a segmental hood arranged at the discharge end of the conveyer to deflect the grain and straw downward, substantially as described.

3. In a separator, the combination of a threshing mechanism, a fan-casing below the same, a funnel arranged to conduct the discharge from the threshing mechanism to the fan-casing, a conveyer connected to the fan-casing having its discharge end wider than its receiving end, and having its top and bottom walls bent toward each other so as to provide a vertically-contracted throat, a centrifugal fan located in said casing and adapted to force the grain and straw discharged into the casing up through the conveyer, and a skeleton grate arranged below the discharge end of the conveyer through and upon which fall respectively the grain and the straw, substantially as described.

4. In a separator, the combination of a threshing mechanism, a fan-casing below the same, a funnel arranged to conduct the discharge from the threshing mechanism to the fan-casing, a conveyer connected to the fan-casing having its discharge end wider than its receiving end, and having its top and bottom walls bent toward each other so as to provide a vertically-contracted throat, a centrifugal fan located in said casing and adapted to force the grain and straw discharged into the casing up through the conveyer, a skeleton grate arranged below the discharge end of the conveyer through and upon which fall respectively the grain and the straw, and means to direct an air-blast rearwardly through the space between the discharge end of the conveyer and said grate to facilitate the separation of the straw and the grain, substantially as described.

In testimony whereof I affix my signature in the presence of two witnesses.

CLARENCE L. RING.

Witnesses:
JOS. H. RING,
FRANK O. JOHNSON.